United States Patent [19]
Vincent

[11] 3,788,412
[45] Jan. 29, 1974

[54] SNOWMOBILE SUSPENSION SYSTEM

[75] Inventor: Marcel Vincent, Vercheres, Quebec, Canada

[73] Assignee: The Coleman Company, Inc., Wichita, Kans.

[22] Filed: May 17, 1972

[21] Appl. No.: 254,135

Related U.S. Application Data

[63] Continuation-in-part of Ser. No. 179,780, Sept. 13, 1971, abandoned.

[52] U.S. Cl. ............................... 180/5 R, 305/25
[51] Int. Cl. ............................................. B62d 27/02
[58] Field of Search .................. 180/5 R; 305/24, 25

[56] References Cited
UNITED STATES PATENTS

| | | | |
|---|---|---|---|
| 3,613,811 | 10/1971 | Brandli | 180/5 R |
| 3,703,936 | 11/1972 | Padwick | 180/5 R |
| 3,620,318 | 4/1970 | Gostomski | 180/5 R |
| 2,756,045 | 7/1956 | Savory | 267/8 R |
| 3,674,103 | 7/1972 | Kiekhaefer | 180/5 R |
| 3,480,096 | 11/1969 | Hammitt | 180/5 R |
| 3,692,132 | 9/1972 | Pollanen | 180/5 R |
| 3,719,242 | 3/1973 | Duclo | 180/5 R |
| 3,701,394 | 10/1972 | Hendrickson | 180/5 R |
| 3,721,308 | 3/1973 | Brandli | 180/5 R |
| 3,707,198 | 12/1972 | Pierson | 180/5 R |
| 3,727,709 | 4/1973 | Newman | 180/5 R |
| 3,485,312 | 12/1969 | Swenson | 180/5 R |

*Primary Examiner*—Richard J. Johnson

[57] ABSTRACT

A suspension system for tracked vehicles, more particularly snowmobiles, provides improved operation together with a smoother ride. The rear suspension of the frame and slide bar assembly is suspended from the snowmobile chassis by combined shock absorber and axially deformable tubular coil spring units pivotally attached to extend upwardly and rearwardly so that the coil spring and shock absorber units act downwardly and forwardly on the rear idle wheels and slide bars.

17 Claims, 11 Drawing Figures

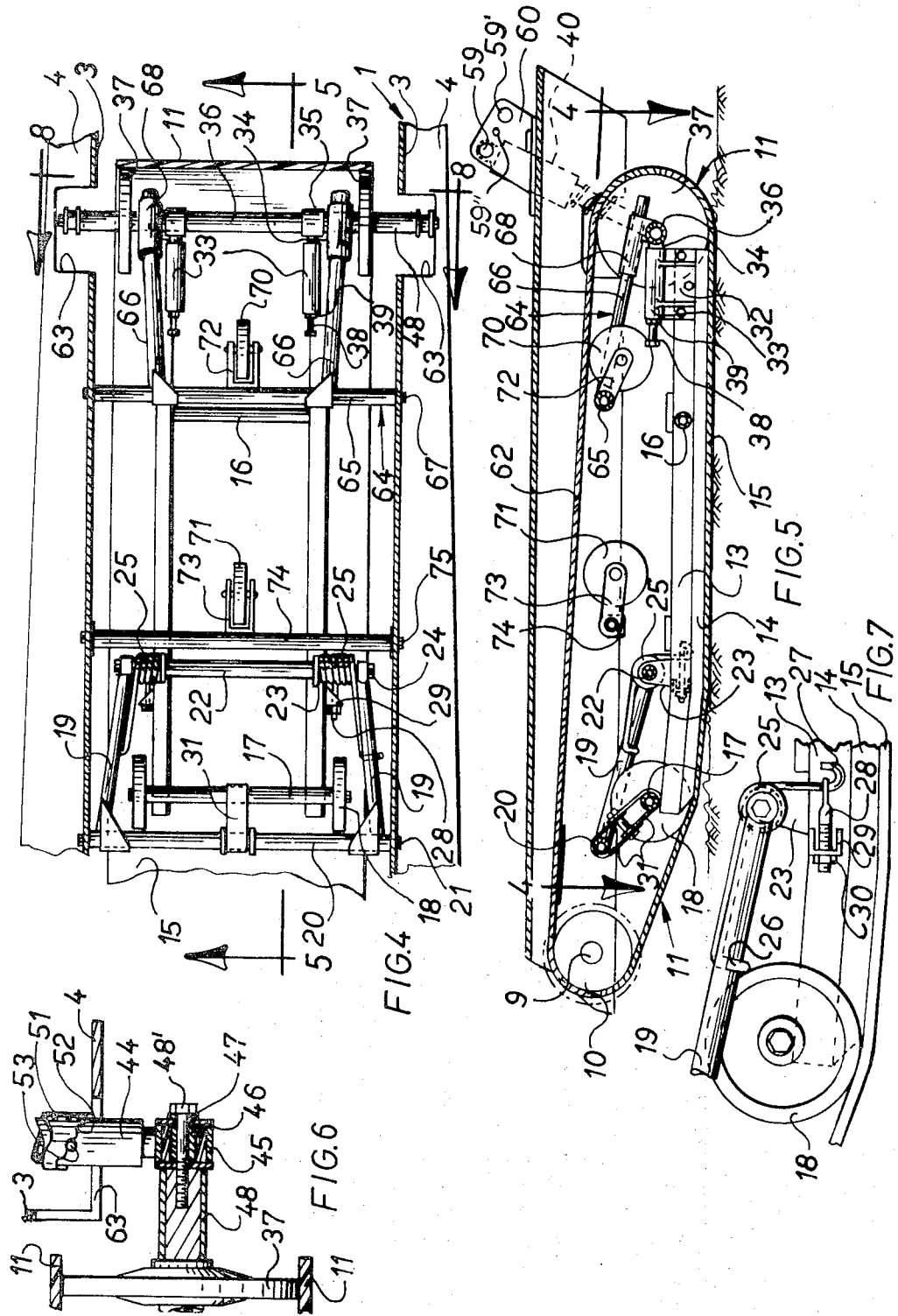

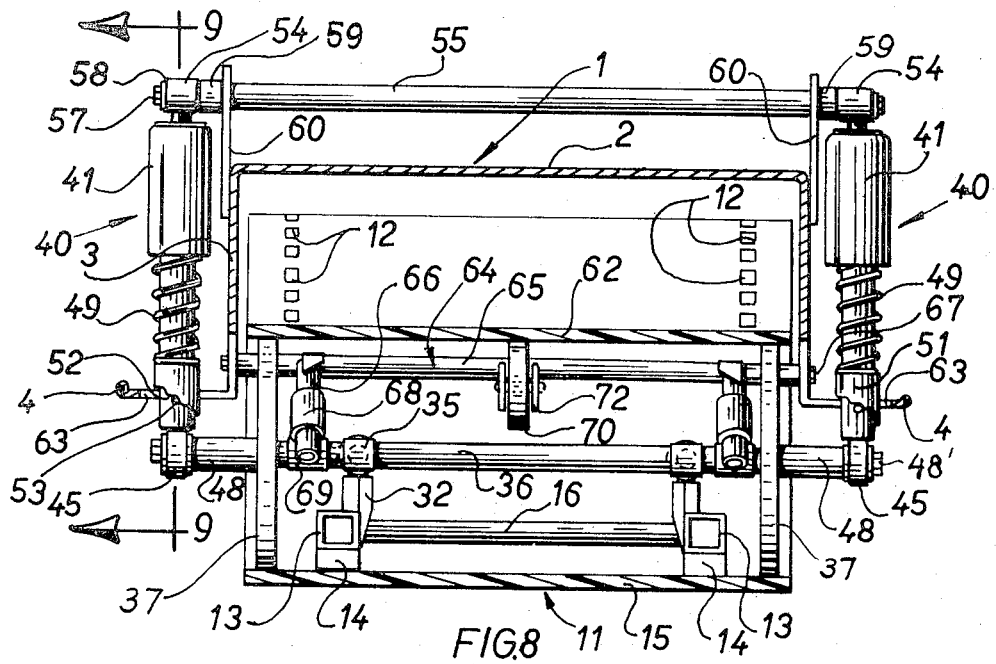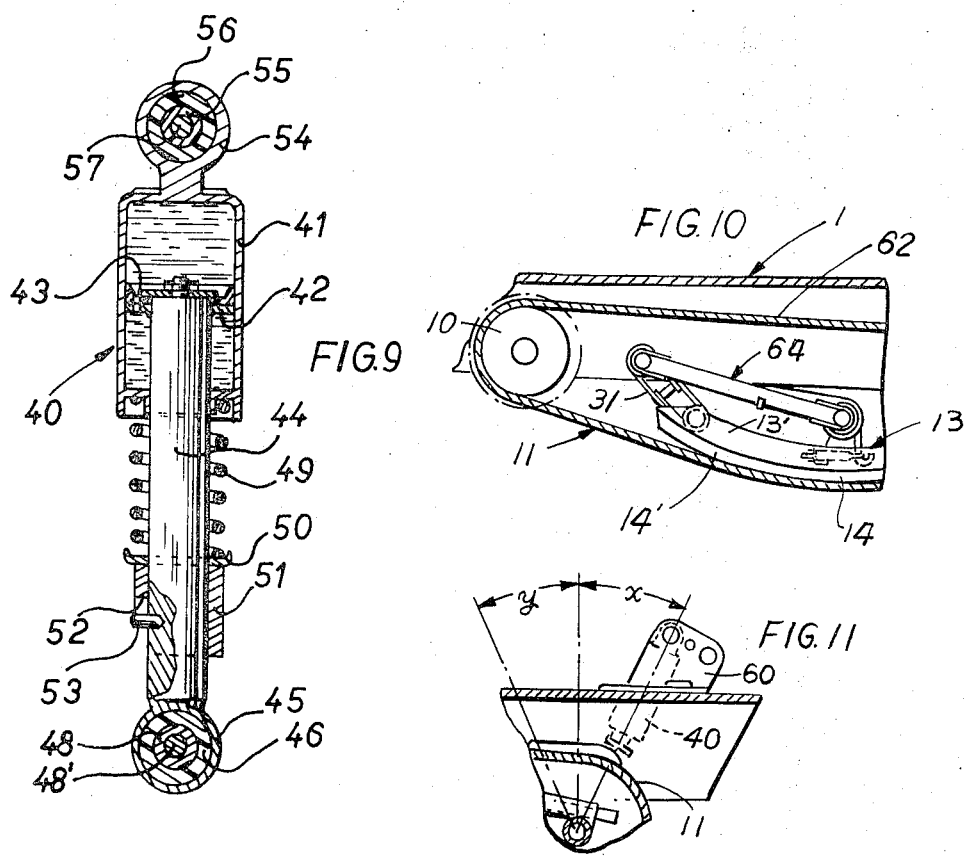

SNOWMOBILE SUSPENSION SYSTEM

CROSS-REFERENCE

This application is a continuation-in-part of my co-pending application Ser. No. 179,780, filed Sept. 13, 1971 and now abandoned.

BACKGROUND AND SUMMARY

The present invention relates to tracked vehicles and, more particularly, to an improved suspension for tracked vehicles, such as snowmobiles.

Known suspension systems for snowmobiles produce a relatively rough ride on uneven ground, even if springs and shock absorbers are used for the suspension.

Because these springs and shock absorbers are always mounted within the elongated loop formed by the endless track, and, therefore, within a very small space, especially in a vertical direction, it has been found impossible to mount the shock absorbers at more than 30° to the horizontal, and it has been the practice to use torsion springs of the type in which the deflection is radial with respect to the long axis of the spring. Such springs are usually mounted about a transverse shaft with one end of the spring secured to the vehicle chassis and the other end engaging an inclined arm supporting the track engaging slide members or bogey wheels.

Due to this arrangement of the springs and shock absorbers, the active stroke of the springs and shock absorbers is very limited and, consequently, such springs and shock absorbers must be made very stiff, that is the springs must have a high rate of increase of resistance to deflection and the shock absorbers must be made so as to have a high resistance to deflection and the shock absorbers must be made so as to have a high resistance to axial shortening. Therefore, the resulting suspension is very stiff, the suspension system absorbing the upward movement of the track at too high a rate of resistance. Moreover, in some known suspensions, the back track engaging idle wheels serve not only to press the rear end of the track loop on the ground, but also to keep the track in taut condition. They are carried by pivoted forwardly downwardly inclined short arms urged downwardly by the same type of torsion springs, as previously noted. These last-named springs must be very stiff, not only to resist upward movement of the idle wheels but also to properly maintain the track in taut condition. Moreover, due to the short arm construction of the means to carry these idle wheels, any shock imparted thereto is directly transmitted to the vehicle chassis and, therefore, to the passengers. Moreover, upward movement of the rear idle wheels results in track loosening whereby the track has a tendency of alternately becoming taut and loose when the snowmobile rides over rough terrain.

One general object of the invention is to provide a tracked vehicle suspension which will overcome the above-noted disadvantages, resulting in a smoother ride, but without sacrificing control and other performance characteristics. More specifically it is desired to improve performance under normal operation and under conditions of acceleration, deceleration, braking, turning, and hill climbing.

Another object of the invention resides in the provision of a suspension system of the character described, which is provided with torsion bar means to prevent undue tilting of the vehicle when negotiating a curve.

Where the rear or track return idle wheels are solidly mounted against forward movement (not spring-biased) on slide rails which extend from the length of the track, pivot arms have been provided to connect the forward and rearward portions of the slide bars to the body chassis. For example, the forward end portions of the slide bars have been connected to the chassis by forwardly and upwardly inclined arms. With such mounting arrangements, it has been found that under conditions or acceleration a so-called "jacking" action takes place.

Jacking occurs during acceleration because the increased track tension along the top of the track causes a forward shifting of the return idlers and slide bars. This movement swings the front pivot arms downwardly, lifting the front end of the smowmobile.

While "jacking" can increase traction at the front during acceleration, in prior suspensions providing this function, the rearward weight transfer caused the suspension to depress or collapse at the rear, and no means has been provided for preventing this from occurring with loss of track tension and traction toward the rear.

To facilitate the turning of the snowmobiles, it is desirable to produce a forward weight shift onto the steering skis, thereby relieving traction pressure on the tread, and permitting the track to move laterally more readily than it would under full traction pressure. The problem has been to accomplish this without loss of control. On braking, where the front pivot arms swing upwardly due to tension along the track bottom, the weight is thrown onto the skis and also on the track rear. The effect is to tend to collapse the rear of the suspension with so much loss of traction that control and directional stability can be jeopardized.

Still another operational problem occurs on hill climbing. The upward inclination of the snowmobile as well as the jacking action at the front transfers weight to the rear. This can cause a collapse of the rear portion of the suspension, accentuating the raising of the front in relation to the rear. This limits the steepness of the grades which can be ascended with safety, and also reduces the speed at which hills can be climbed. However, no one heretofore has provided a suspension which acts to counteract the rearward weight transfer and maintain good traction and control, thereby providing improved hill climbing performance both as to speed and grade.

The snowmobile suspension of this invention therefore accomplishes important results by improving the action of the snowmobile under conditions of acceleration, deceleration, and hill climbing, as well as under conditions of normal operation.

THE DRAWINGS

The snowmobile suspension of this invention is shown in illustrative embodiments, in the accompanying drawings, in which:

FIG. 4 is a top plan view of the suspension with a plan section of the chassis and taken along line 4—4 of FIG. 5;

FIG. 5 is a longitudinal section taken on line 5—5 of FIG. 4;

FIG. 6 is a partial cross-section taken at the back of the vehicle and showing the endless track, one of the rear track engaging idle wheels, the shaft therefor and the connection of the shaft to the shock absorber;

FIG. 7 is a side elevation, on an enlarged scale, of the front of the slide member, the idle wheel carried by the slide member and the suspension arm therefor;

FIG. 8 is a cross-section of the vehicle taken along line 8—8 of FIG. 4;

FIG. 9 is a longitudinal section of the combined shock absorber and spring unit, taken along line 9—9 of FIG. 8;

FIG. 10 is a fragmentary side elevational view, partially in section, showing a modification of the forward portion of the suspension; and FIG. 11 is a diagrammatic view illustrating angular positions of the shock absorber and compression spring units.

In the drawings, like reference characters indicate like elements throughout.

DETAILED DESCRIPTION

Figure 1:
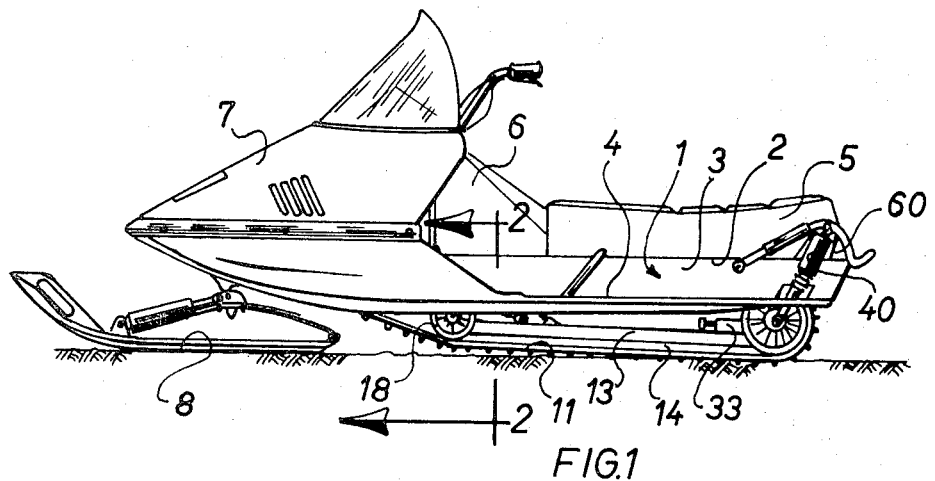
FIG. 1 is a side elevation of a snowmobile provided with the endless track suspension system of the invention.
Figure 2:
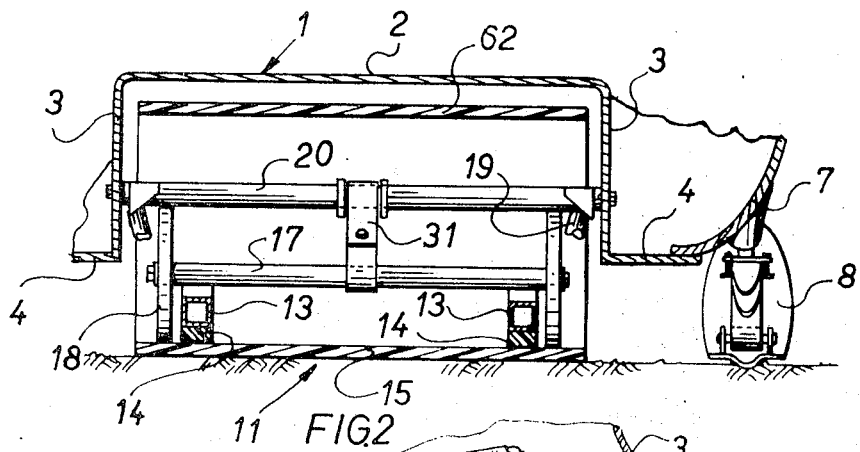
FIG. 2 is a cross-section along line 2—2 of FIG. 1, on an enlarged scale.
Figure 3:
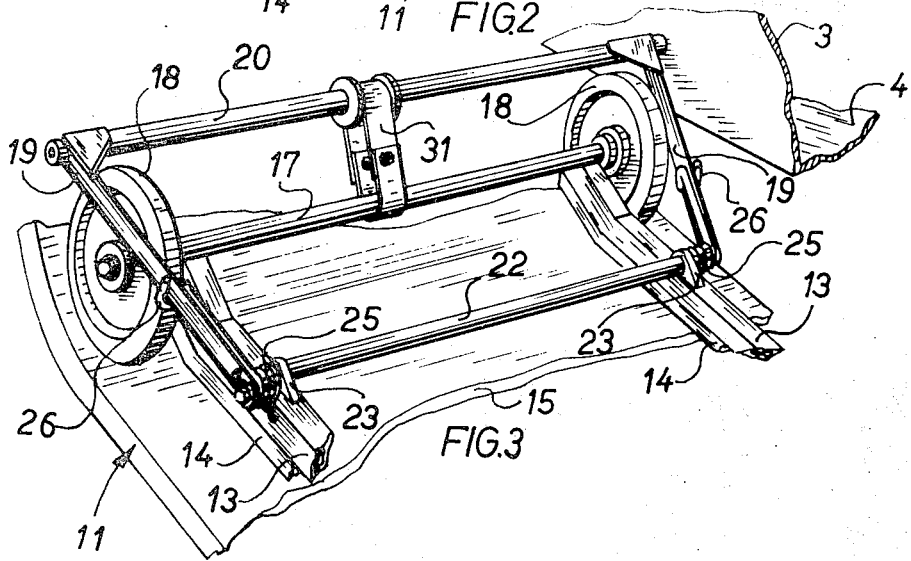
FIG. 3 is a partial perspective view of the front end portion of the suspension showing also the endless track.

FIG. 1 is a side elevation of a snowmobile provided with the suspension system of the invention. The snowmobile has a chassis 1, including a body tunnel of inverted U-shape cross-section, providing a top 2 and downwardly extending side walls 3, the lower edge of which are bent to form outwardly extending flanges 4 serving as foot-rest. The top wall 2 of chassis 1 supports a passenger seat 5 extending substantially to the rear end of chassis 1 and short of the front end thereof. The front portion of the top of chassis 1 supports a passenger seat 5 extending substantially to the rear end of chassis 1 and short of the front end thereof. The front portion of the top of chassis 1 supports a fuel reservoir 6 and an engine which is located underneath the front hood 7 of the snowmobile. The front of the snowmobile chassis is supported by the usual steerable ski assembly 8. The engine, not shown, drives through a suitable transmission a drive shaft 9, shown in FIG. 5, which extends transversely across the chassis 1 and is journalled in the side walls 3 thereof.

The drive shaft 9 carries a pair of sprocket wheels, indicated at 10 in FIG. 5, which serves to drive the endless track 11 in rotation. For that purpose, as in conventional construction, the track 11 is provided with two series of longitudinally extending holes 12, as shown in FIG. 8, for receiving the teeth of the sprocket wheels 10. The track is of any conventional construction, being preferably made of rubber with reinforcing plies. The suspension system of the invention for suspending the track 11 comprises a pair of rigid slide members 13, of square tube construction, and carrying at their underside a slide bar 14, generally of synthetic resin material, to slidably engage with a minimum of friction the inside surface of the bottom run 15 of the track 11.

The rigid members 13, together with their slide bars, are disposed within the elongated loop formed by the endless track longitudinally of the track and chassis and are normally disposed to slide on the metal reinforcing clips (not shown) surrounding the edges of the holes 12. These slide bars are secured together by a cross tube 16, as shown in FIG. 4, intermediate the ends of the rigid members and by a cross tube 17 secured to the front end of the rigid members 13 and which also serve to rotatably support front idle wheels 18 engaging the bottom run 15 of track 11 and serving to ease the engagement of said bottom run with the front portion of the slide bars 14, the bottom run 15 being forwardly upwardly inclined from front idle wheels 18 towards sprocket wheels 10.

The front of rigid members 13 is suspended from the chassis by means of a pair of rigid suspension arms 19. These arms are rigidly connected together to form a U-shape unit by means of a transverse tube 20. The tube 20 extends across the chassis 1 within the same and is pivotally connected thereto by means of bolts 21.

The suspension arms 19 extend rearwardly from their pivotal connection to the chassis downwardly at a small angle with respect to the horizontal of a maximum of 30° and generally substantially less. The rear end of suspension arms 19 is rotatably mounted on a pivot rod extending through a transverse tube 22 rigidly secured to the top of rigid members 13 by means of brackets 23, clearly shown in FIGS. 4, 5, and 7.

Bolts 24 are screwed within the rod in tube 22 and maintains the assembly in position. Thus, the tube 22 constitutes the transverse pivotal axis of the rear free ends of the suspension arms 19.

A torsion coil spring 25 is associated with each suspension arm 19. Each torsion spring 25 is wound as a spiral surrounding a freely rotatable sleeve, not shown, on the rod extending through tube 22. One end of the torsion spring 25 forms a hook 26 partially surrounding suspension arm 19, while the other end forms a hook 27 to which an eye bolt 28 is attached, said eye bolt being adjustably positioned by passing through a bracket 29 secured to rigid member 13 and provided with an adjusting nut 30.

The torsion spring 25 urges rigid members 13 downwardly with respect to the chassis, that is out of the downwardly facing opening formed by the U-shape of the chassis 1. The force with which the springs act on the rigid members can be adjusted by adjusting nut 30. The downward movement of the rigid members with respect to the chassis is limited by a rigid strap 31 freely surrounding the central zone of the assembly formed by transverse tubes 20 and 17. This strap 31 allows closing in movement of these two tubes 20 and 17, but limits the separation.

The rear end of each rigid member 13 carries a bracket 32 upstanding therefrom forming a sleeve 33 having its bore parallel with the rigid member 13 and receiving at its rear open end a stud shaft 34, which is longitudinally displaceable within the sleeve 33 and which is secured to a collar 35 which rotatably surrounds a rod 36 serving as a pivot axis for the back idle wheels 37, which engage the back end of the elongated loop formed by the endless track 11.

The stud shafts 34 abut against a bolt 38 adjustably locked by a lock nut 39 and threaded in a smaller diameter threaded bore portion of sleeve 33. Thus, the longitudinal position of the pivotal axis of the wheels 37 can be adjusted in order to adjustably vary the tautness of the track 11.

The bottom portion of the idle wheels is substantially tangent with the rear end portion of the slide bars 14, so as to freely receive the back of the endless track which is trained on the idle wheels.

In accordance with a most important feature of the invention, the back portion of the suspension assembly is connected to the chassis by the intermediary of combined shock absorber and compression coil spring units, generally indicated at 40.

These units are known per se but the manner of incorporating the same into a tracked vehicle suspension and the resulting structure are completely new.

Each unit 40 (see FIG. 9) comprises a cylinder 41 filled with hydraulic fluid and a piston 42 movable in the cylinder and having a bleed hole 43, of small diameter, for the slow passage of the fluid from one side to the other of the piston. The piston is rigidly connected to a piston rod 44 provided at its free end with a collar 45 adapted to rotatably surround a rubber sleeve 46, itself surrounding a wheel shaft extension 48 and retained on said wheel shaft extension by a washer and a bolt 48'. As shown most clearly in FIG. 8, the shock units 40 are therefore mounted and connected outside the track 11 and funnel of chassis 1. This permits the selection of a critically small inclination with respect to the vertical for the axial orientation of shock units 40, as will be subsequently described.

A compression coil spring 49 freely surrounds the piston rod 44, abuts at one end against cylinder 42, and at the other end against a washer 50, which surrounds the piston rod and is adjustably positioned longitudinally thereof. The washer 50 has a sleeve 51 which can be rotated about the piston rod so that the various portions of its stepped edge 52 may abut against a locating pin 53 secured to the piston rod.

The outer end of cylinder 41 is provided with a collar 54 which rotatably surrounds a pivot shaft 55 with the interposition of a rubber bushing 56. The end of the pivot shaft 55 with the interposition of a rubber bushing 56. The end of the pivot shaft 55 has a threaded bore to receive a bolt 57 to retain the collar 54 on the pivot shaft with the interposition of a washer 58.

The pivot shaft 55 is removably inserted through, and supported by, one or the other of the two sleeves 59, 59' on each side of the chassis, each pair of sleeves 59, 59' being secured to, and carried by, a bracket 60 welded to the side of the chassis 1. Pivot shaft 55, which removably extends through the aligned sleeves 59 or 59' serves to reinforce the top pivotal connection of units 40. The pivot shaft 55 can extend through a suitable hole made in the seat 5 resting on top 2 of chassis 1.

It will be noted (FIGS. 1 and 5) that the operational axis of the combined shock absorber and compression coil spring unit 40 extends at a small rearwardly inclined angle with respect to the vertical, such as about 22° with respect to the vertical or about 68° to the horizontal (taking the place of chassis top 2 as horizontal). However, this angle, or inclination, can be varied. Referring to FIG. 11, the angle $x$ should be in the range from 5° to 45°. An excellent working range is from 15° to 35°. It is important that coil springs 49 act both downwardly and forwardly. The use of a forward inclination, such as indicated by the angle $y$ in FIG. 11 is therefore not desirable. With the preferred construction the coil springs 41 are selected so that they only partially compress under normal operating conditions, including conditions of acceleration and hill climbing. It will be appreciated that the angle (or line of action) of the shock units will change as they compress. As specified herein, therefore, the angle $x$ (See FIG. 11) should be understood as being stated in relation to the normal (uncompressed) position of the shocks and the normal (horizontal) alignment of the slide bars and chassis top.

The functioning of shock units 40 will be further explained below under the "Operation" section of this specification.

Within the limits of the angular orientations just described, the shock units 40 can be selectively positioned to vary the spring support between the chassis and the suspension. For shock absorbers of a given specification, as the shocks are positioned more nearly vertical, that is, at a lesser angle to the vertical, their weight supporting capacity is increased. Consequently, it may be desirable to provide for the adjustment of the inclination of the shocks from a rearward position of greater inclination to a forward position of lesser inclination, as the load is increased, as previously described.

There are two sleeves 59, 59' angularly spaced apart with respect to the axis of the back idle wheels 37. The units 40 can thus be selectively connected to one or the other of sleeves 59, 59', in the rear position, that is when connected to sleeve 59', the angle will be about 58° to the horizontal, or about 32° to the vertical. A similar mounting arrangement can also be provided at the intermediate position 59'. Othe means for pivotally attaching the upper ends of shock units 40 can also be provided.

It will be noted that the point of attachment of the top end of the units 40 is well above the top run 62 of the endless track 11 and actually above the chassis tunnel top 2. The units 40 extend on the outside of the track 11 and, preferably also, on the outside of the side walls 3 of chassis 1, as shown; they pass freely through a hole 63 made in the side flanges 4 of chassis 1.

In accordance with another feature of the present invention, the suspension is provided with a stabilizer torsion bar means to prevent undue lateral tilting of the chassis with respect to the track. A U-shaped torsion bar, generally indicated at 64, is provided. This torsion bar is of tubular construction and includes a transverse tube 65 and a pair of longitudinal tubes 66 rigidly secured to transverse tube 65 at one end. The transverse tube 65 extends transversely across the chassis 1 within the same and within the loop formed by the endless track 11, being pivotally connected to the chassis by means of bolts 67.

The longitudinal tubes 66 are slidably inserted within sleeves 68, which are rigidly secured to collars 69 (see FIG. 8) rotatably surrounding the transverse pivot rod 36 of the back idle wheels 37.

The longitudinal tubes 66 extend rearwardly downwardly from the transverse tube 65 at a slight angle to be horizontal. The tubes 66 slide freely within their sleeves 68 and the sleeves 68 are free to rotate about rod 36 during up-and-down movement of the back end of the suspension assembly with respect to chassis 1.

To prevent sagging of the top run 62 of the endless track, the same is supported by a pair of longitudinally spaced idle wheels 70, 71 arranged along the center line of the endless track within the loop formed thereby and engaging the underside of the top run 62.

Idle wheel 70 is carried by a bracket 72 secured to transverse tube 65 of torsion bar 64. Idle wheel 71 is mounted on bracket 73 secured to a transverse tube 74, itself secured at its ends to the side walls 3 of the chassis 1 by means of bolts 75.

It will be noted that in the rest position of the vehicle, as shown in FIG. 5, the transverse pivotal axes 9, 20, and 36 are substantially in alignment and that the geometry is such that the rear pivotal axis 36 of the back idle wheels 37 can theoretically describe movements about front pivot axis 9 or about pivot axis 20 along circular arcs which are substantially coincident, at least in the normal range of the up-and-down movement of the back idle wheels 37.

Moreover, it will be noted that the arms 19 form a toggle lever arrangement with the rigid members 13 and idle wheels 37 acting on the endless track 11. When the rigid members 13 move upwardly, the suspension arms 19, which describe an upward act of a circle, tend to move the wheels 37 rearwardly, whereby the latter take up the slack in the endless track 11 caused by the upward movement of the front portion of the rigid members 13. Thus, the endless track is constantly maintained in a uniform degree of tautness during up-and-down movement of the rigid members 13 when the vehicle negotiates uneven ground. Also, the back wheels 37, which are carried by the rigid members 13, themselves connected to the vehicle chassis through the rearwardly slightly inclined suspension arms 19, maintain the track in the required taut condition. The only elements resisting the up-and-down movement of the back wheels 37 are the combined coil spring and shock absorber units 40.

Because the axially compressible coil springs 49 are used and because these springs may have any length desired, being located on the outside of the endless track and, therefore, not confined with the elongated loop of said track, which is of restricted height, they can be arranged to have a low rate of increase of resistance to axial compression, that is to the upward movement of the idle wheels 37, as compared to an arrangement which would be similar to the torsion spring 25 used for the front suspension portion. Thus, upward movement of the rear end of the suspension is very gradually resisted by the axial compression springs. Similarly, the shock absorbers 41 when inclined from 5° to 45° to the vertical will have a much longer active stroke than shock absorbers arranged in a more nearly horizontal position within the elongated loop formed by the endless track. Thus, the shock absorbers 41 can be arranged to more gradually absorb the impact caused by the upward movement of the rear portion of the track. The result is a much smoother ride than with conventional suspensions.

By attaching the upper ends of units 40 in either collars 59 or 59' and thus selectively varying the inclinations of the units 40, one can adjust the softness of the suspension. A softer suspension is had when the rear sleeves 59' are used as a connection. The more vertical are the units 40, the stiffer the suspension will be. Similarly, the stiffness of the torsion springs 25 can be easily adjusted by the eye bolts 28. The tautness of track 11 can be easily adjusted by the bolts 38.

The construction of the combination compression spring and shock absorber units 40 is more clearly shown in FIG. 9, which illustrates the normal intermediate position of the piston 42. The shock absorber is therefore double-acting, permitting shortening by upward movement of the piston rod 44, or lengthening by downward movement of the piston rod, both actions being against the gradual resistance of the shock absorber fluid. Since the construction and operation of double-acting shock absorbers is well known in the art, it is not believed to be necessary to describe it herein.

Although the units 40 have been shown as being on the outside of the side walls 3 of chassis 1, they could be arranged inwardly of the same as long as they are on the outside of track 11, so that their top pivotal connection will be above at least the top run 62 of the track and, preferably, above the top 2 of the chassis, as shown.

In a preferred embodiment, there is about 12 inch distance between pivot shaft 36 and the top pivotal connection of units 40; this is a much greater vertical distance than that which can be provided within the elongated loop of track 11, which is about normally 6 inch, it being noted that the vertical up-and-down movement of the track is normally about 4 inch.

The torsion bar assembly 64 is of very simple construction and prevents lateral tilting of the chassis, while allowing complete freedom of vertical up-and-down movement of the track.

It will be noted that the idle wheel 70 follows the up-and-down movement of the suspension.

The suspension assembly can be easily connected to the chassis after it has been pre-assembled, because straps 31 limit the pivotal movement of the torsion arms 19 with respect to rigid members 13.

As a modification, torsion springs 25 could be removed and replaced by axially compressible coil springs or by combined axially compressible coil spring and shock absorber units, such as units 40, disposed on the outside of track 11 and the chassis and pivotally connected to the rigid members 13, as forwardly as possible, to brackets secured to chassis 1 as with the arrangement of the units 40, so as to obtain a suspension at the front similar to that at the back of the vehicle so as not to interfere with the driver's legs.

Looking now at FIG. 10, there is shown a modification of the forward portion of the suspension, wherein front idle wheels 18 are omitted, and the slide bars 13 are provided with upwardly curved forward extensions. As shown in FIG. 10, the rigid slide bars are provided with a forward extension 13', and the slide 14 is provided with a forward extension 14'. The curved forwardly extending portion of the slide bar 13, as provided by extensions 13', 14' serves to guide the track 11 as it comes off of the sprocket wheels 10 onto the under surface of the slide bars for driving engagement with the ground.

OPERATION

The novelty and inventive advance of the suspension of this invention can best be appreciated by considering its operation under various conditions. During normal operation of a snowmobile, the suspension is continually required to conform to the contours of the terrain. With the suspension of the present invention, when the front is compressed by an obstacle (caused to swing upwardly and rearwardly), the resulting rearward movement of the slide bars causes the rear shock units to assume a more nearly vertical position, thereby, in effect stiffening the rear shock units. Similarly, a compression of the rear shocks results in a stiffening of the front of the suspension. The motion is analogous to that obtained by a three-bar linkage in trapezoid form, whereby the horizontal bar represents the slide bars, and the inclined bars represent the front pivot links, and the rear shock units, respectively. An inherent rocking movement of the slide bars thereby results, especially at lower speed operation, which increases rider comfort over bumpy terrain, while the rocking movement of the slide bars assures maximum contact between track and ground at all times. The rocking movement also assures proper tightness of the track, since the slack created at one end of the suspension is taken up at the other end. The suspension also provides satisfactory rider comfort at higher speeds of operation, while continuing to give good traction, maintain proper track tightnedd, and providing excellent operator control.

The suspension system of this invention also provides an inherent new method of functioning under conditions of deceleration or braking. During deceleration or braking, tension in the bottom of the track between the rear idle wheels and the front sprockets tends to pull the track and slide bars into a straight line extending tangentially between the lower sides of the sprocket wheels and rear idle wheels. This action lifts the front pivot arms, compressing the front of the suspension. The lifting of the front pivot arms causes the slide bars to shift rearwardly, which in turn shifts the lower pivot connections of the shock units rearwardly, and thereby decreasing the angle of the line of action of the shock units with respect to the vertical. On the new line of action where the shock units are more nearly vertical, greater force is required to compress the shocks a given distance, and therefore the rear of the suspension is in effect stiffened. This stiffening is important. Under the braking or deceleration conditions, after the front of the suspension has been compressed, the vehicle is substantially supported only by the skis in front and the idler wheels in the rear, most of the weight being shifted onto the skis with some increase in the weight shifted to the rear idlers. The forward portion of the track is relieved from ground engaging pressure, which permits the vehicle to be steered very easily. On turning, the forward portion of the track can move laterally with a minimum of ground friction and drag. At the same time, however, the shifting of weight to the rear idlers does not cause any undue compression of the rear shock units, the units having been stiffened by being brought to a more nearly vertical position, thereby automatically compensating for the increased weight load. Control and directional stability is also promoted by this method of functioning, since on deceleration or braking, the distance is increased from the skis to the center of the pressure of the track with the ground.

The suspension of this invention also performs well under accelerating conditions, and provides a marked improvement in operation for hill climbing, permitting steeper grades to be climbed, grades to be climbed more rapidly, or both. As with prior snowmobile suspensions, during acceleration or hill climbing, track tension in the top portion of the track causes a forward movement of the slide bars. The front pivot links thereby assume a more nearly vertical position, which in effect lifts the front end of the snowmobile. The weight on the skis is thereby reduced, and weight is transferred to the slide bars. As a result, traction under the slide bars is improved, and friction under the skis is reduced. Loss of control during acceleration is avoided by virtue of the limiter (the strap 31), which prevents the front pivot links from becoming too vertical.

Once the strap 31 has started to function as a limiter, against further downward movement of the front pivot links, the resulting action is different and better than prior art suspensions by virtue of the contribution of the rear shock units 40. Specifically, the front linkage, in effect, becomes rigid with the slide bars, and the entire suspension assumes a new front pivot point located at the front body mount (viz. shaft 20). Compression of the rear of the suspension then results in a rearward movement of the suspension. Further, when the angle of the shock units 40 has been selected as previously described, the combined movement of the suspension about the new pivot (shaft 20) applies force to the rear idle wheels and the shock units along a line more nearly corresponding (parallel) with the axis of the shock units 40. This in effect provides a stiffer support by the rear shock units, which strongly resist collapsing of the rear of the suspension along their axis. Such collapsing can interfere with vehicle control. The "stiffening" of the rear of the suspension, as described, is most effective during climbing, where weight transferred toward the rear due to track tension and vehicle attitude combined can easily result in loss of control. Suspension systems of prior art snowmobiles do not provide for such automatic stiffening of the rear of the suspension.

In a particular embodiment, which has been found to be a desirable mode of practicing the invention, the mounting brackets 60 are provided with only two mounting positions for the pivot connections to the upper ends of the shock units 40. The position of maximum support and stiffness is located at about 24° to 26° to the vertical, having reference to the uncompressed or normal condition of the shock units and where the slide bars are in their normal horizontal alignment. The second position of lesser support and stiffness is located at an inclination of the shock units of about 29° to 31° with respect to the verical. The shock units can be selected to have a maximum range of movement of the piston of from 3 to 4 inches, and the compression springs can be selected to require a force of 800 to 900 lbs. for full compression. With this embodiment, the extent of contraction of the shocks under usual operating conditions can be limited to about ¾ to 1 ¼ inches. Under extreme impact conditions, the shocks can fully collapse with the piston 42 moving up until spring 49 is fully compressed or until piston 42 contacts the top of the cylinder 41. Under usual operating conditions, the extension of the shock units will also be correspondingly small. As already pointed out, the strap 31 serves as the limit on the forward movement of the slide bars, and thereby also limits the maximum extension of the piston rod 44.

Where the suspension is provided with front idle wheels, such as idle wheels 18, the wheels can provide a final limit on the upward movement of the slide bars front ends. Under extreme impact conditions at the front, the slide bars might be kicked up against the underside of the top run of the tread, but before such contact can occur, the tops of the front idle wheels 18 contacts the under side of the tread. Where the front idle wheels are omitted, as in the modification of FIG. 10, the limit strap 31 can provide an upper limiting action. In a similar manner to its downward limiting action, when the front ends of the slide bars have pivoted upwardly far enough, further upward movement can be prevented by the tightening of strap 31 about the shafts 20 and 17.

I claim:

1. In combination with a snowmobile having an elongated body chassis with a rearward portion of inverted U cross-section providing a tunnel opening for receiving a suspension, surface engaging runners disposed to support substantially the forward portion of said body chassis, a motor mechanism mounted on said forward chassis portion, and a tread driving mechanism mounted on said chassis adjacent the forward end of said tunnel opening, said driving mechanism including sprocket wheel means, a suspension system for said tread providing limited degrees of movement in all directions, said systems including an elongated tead supporting frame within said tunnel and providing a pair of rigid slide bars extending substantially from the front to rear of said suspension along the bottom thereof, an endless flexible tread moving within said tunnel and enclosing said frame, said sprocket means being in driving engagement with said tread, said slide bars bearing against and urging the bottom run of said tread into traction engagement with the ground beneath said snowmobile as said tread is driven, pivot arms means connecting the forward portion of said frame to said chassis and being inclined downwardly and rearwardly, spring means yieldably pressing said pivot arms in a downward direction, means for positively limiting the extent to which said pivot arms can swing downwardly, means for guiding said tread onto the forward portions of said slide bars, and idle wheel means mounted on the rearward end portions of said slide bars for guiding said tread to return to said sprocket means, said idle wheels being fixed against forward shifting with respect to said slide bars, wherein the improvement comprises: a pair of combination coil spring and shock absorber means mounted at the rear of said chassis along each side thereof outside of said tunnel, said combination means having their lower ends pivotally connected to the rear portion of said frame adjacent said idle wheels and their upper ends pivotally connected to said chassis, said combination means being disposed with their axes extending upwardly and rearwardly, said idle wheels being movable upwardly by contracting said combination means and movable downwardly by extending said combination means, and said coil springs of said combination means urging said idle wheels and the rear end portions of said slide bars downwardly and forwardly.

2. The combination of claim 1 wherein said improvement is further characterized by the fact that said combination coil spring and shock absorber means are disposed to incline upwardly and rearwardly from said slide bars to said chassis at an angle within the range of 5 to 45° to the vertical when said slide bars are horizontal and said combination means are uncompressed.

3. The combination of claim 1 wherein means is provided to permit selective adjustment of the rearward and upward inclination of said combination means.

4. The combination of claim 1 wherein means is provided to permit selective adjustment of a pre-set compression for said coil springs.

5. In combination with a snowmobile having an elongated body chassis with a rearward portion of inverted U cross-section providing a tunnel opening for receiving a suspension, surface engaging runners disposed to support substantially the forward portion of said body chassis, a motor mechanism mounted on said forward chassis portion, and a tread driving mechanism mounted on said chassis adjacent the forward end of said tunnel opening, said driving mechanism including sprocket wheel means, a suspension system for said tread providing limited degrees of movement in all directions, said system including an elongated tread supporting frame within said tunnel and providing a pair of rigid slide bars extending substantially from the front to rear of said suspension along the bottom thereof, an endless flexible tread moving within said tunnel and enclosing said frame, said sprocket means being in turning engagement with said thread, said slide bars bearing against and urging the bottom run of said tread into traction engagement with the ground beneath said snowmobile as said thread is driven, pivot arm means connecting the forward portion of said frame to said chassis and being inclined downwardly and rearwardly, spring means yieldably pressing said pivot arms in a downward direction, means for positively limiting the extent to which said pivot arms can swing downwardly, means for guiding said tread onto the forward portions of said slide bars, and idle wheel means mounted on the rearward end portions of said slide bars for guiding said tread to return to said sprocket means, said idle wheel means being fixed against forward shifting with respect to said slide bars, wherein the improvement comprises: combination coil spring and shock absorber means having a common axis mounted at the rear of said chassis along the sides thereof outside of said tunnel, said combination means having their lower end pivotally connected to the rear portion of said frame, said combination spring means being disposed to incline upwardly and rearwardly from said slide bars to said chassis at an angle of 15° to 35° with respect to the vertical when said slide bars are horizontal and said combination means are uncompressed.

6. The combination of claim 5 in which said rear idle wheels are mounted on a common shaft, said shaft extending outwardly beyond said wheels, and said combination means have their lower ends pivotally connected to the said outward extensions of said common shaft.

7. The combination of claim 5 in which means are provided permitting selective adjustment of the rearward and upward inclination of said combination means within said range of 15° to 35°, and means are also provided permitting selective adjustment of a preset compression for said coil springs.

8. A suspension system for a tracked vehicle having an elongated chassis and an endless track forming an elongated loop with a top run from rear to front and a ground-engaging bottom run from front to rear, said track being disposed underneath and longitudinally of said chassis, elongated rigid slide bar members extending within said track and serving to press said ground-engaging run against the ground, driving sprocket wheel means mounted on the front portion of said chassis for driving said track, idle wheel means disposed within said track loop for engaging the rear end portion of said track loop and carried by said rigid members, said idle wheels being mounted on said rigid members by means rigidly holding said wheels against forward movement with respect to said rigid members, spring-loaded pivot arm movably connecting to said chassis the front portion of said rigid members, said pivot arms being inclined downwardly and rearwardly and being yieldably spring-biased in a downward direction, means for positively limiting the extent to which said pivot arms can swing downwardly, and means for guiding said tread onto the forward portions of said slide bars, wherein the improvement comprises: axially compressible coil spring means mounted between said chassis and the rear portions of said slide bar members externally of said track, said coil spring means having axes inclining rearwardly from points adjacent said idle wheels upwardly to said chassis and being mounted by pivot means permitting the said rearward inclination to increase or decrease, said slide bar rear portions being movable both upwardly and downwardly from their normal substantially horizontal alignment with resulting change in the said rearward inclination of said spring means and said upward movement compressing said coil spring means, whereby the spring compression resistance to the upward movement of said slide bar rear portions increases as the said rearward inclination of said spring means decreases.

9. The suspension system of claim 8 in which said axes of said coil spring means are disposed to incline upwardly and rearwardly from said slide bars to said chassis at an angle of from 5° to 45° to the vertical when said slide bars are horizontal.

10. The suspension system as claimed in claim 8 further including elongated shock absorber means having one end acting on said slide bar members adjacent said rear idle wheels and the other end acting on said chassis above the top run of said track, said shock absorbers also extending externally of said track.

11. The suspension system as claimed in claim 10 wherein the piston rods of said shock absorber means are surrounded by said coil spring means.

12. The suspension as claimed in claim 11, wherein the upper ends of said shock absorber means are pivotally connected to brackets secured to, and upstanding from, the top of the chassis, and wherein the lower ends of said shock absorber means are pivotally connected to a shaft on which said rear idle wheels are mounted.

13. The suspension system as claimed in claim 12 wherein said brackets have at least two similar connecting means spaced longitudinally of said chassis for selective pivotal connection of the upper end of said shock absorbers in angular relation to the vertical, said connecting means being arranged to permit said angular relation to be varied.

14. The suspension system as claimed in claim 8 wherein said spring means provide a preload compression resistance to the upward movement of said slide bar rear portions from their normal horizontal positions and wherein an adjustment means is provided for adjusting the said preload compression resistance of said coil spring means.

15. The suspension system as claimed in claim 8, wherein there are at least two transversely spaced rigid members disposed adjacent the respective sides of said track, and there are two of said rear idler wheels, each associated with, and carried by, one rigid member, said wheels being arranged on a common transverse shaft and further including torsion bar means pivotally connected to said chassis and to said common shaft at spaced points therealong and resiliently resisting transverse inclination movement of said common shaft with respect to said chassis, while allowing free up-and-down movement of said common shaft relative to said chassis, said torsion bar means including a U-shaped member providing legs connected by a cross portion and having its cross portion pivitally connected to said chassis about a transverse axis, and sleeves telescopically receiving the respective legs of said U-shaped member, said sleeves being rotatably mounted on said common shaft of said idler wheels.

16. A suspension system for a tracked vehicle having an elongated chassis and an endless track forming an elongated loop with a top run from rear to front and a ground-engaging bottom run from front to rear, said track being disposed underneath and longitudinally of said chassis, elongated rigid slide bar members extending within said track and serving to press said ground-engaging run against the ground, driving sprocket wheel means mounted on the front portion of said chassis for driving said track, idle wheel means disposed within said track loop for engaging the rear end portion of said track loop and carried by said rigid members, said idle wheels being mounted on said rigid members by means rigidly holding said wheels against forward movement with respect to said rigid members, spring-loaded pivot arm means movably connecting to said chassis the front portion of said rigid members, said pivot arms being inclined downwardly and rearwardly and being yieldably spring-biased in a downward direction, means for positively limiting the extent to which said pivot arms can swing downwardly, and means for guiding said tread onto the forward portions of said slide bars, wherein the improvement comprises: axially compressible coil spring means mounted between said chassis and the rear portions of said slide bar members externally of said track, said coil spring means having axes inclining rearwardly from points adjacent said idle wheels upwardly to said chassis and being mounted by pivot means permitting the said rearward inclination to increase or decrease, said coil spring means having an axial inclination of from 5° to 45° to the vertical when said slide bar is horizontal and means associated therewith permitting selective adjustment of the degree of rearward and upward inclination of said coil spring means, said slide bar rear portions being movabe both upwardly and downwardly from their normal substantially horizontal alignment with resulting change in the said rearward inclination of said spring means and said upward movement compressing said coil spring means, whereby the spring compression resistance to the upward movement of said slide bar rear portions increases as the said rearward inclination of said spring means decreases.

17. The suspension system of claim 16 in which said selective adjustment means confines the adjustment of said upward and rearward inclination of said coil spring means to angles of from 15° to 35° with respect to the vertical when said slide bars are in their normal horizontal alignment.

* * * * *

PO-1050
(5/69)

UNITED STATES PATENT OFFICE
CERTIFICATE OF CORRECTION

Patent No. 3,788,412      Dated January 29, 1974

Inventor(s) Marcel Vincent

It is certified that error appears in the above-identified patent and that said Letters Patent are hereby corrected as shown below:

In the Claims:

In Claim 1, line 15, "tead" should read "tread".

In Claim 8, line 63, the line should read:

"loaded pivot arm means movably connectin to said chassis

Signed and sealed this 14th day of May 1974.

(SEAL)
Attest:

EDWARD M. FLETCHER, JR.
Attesting Officer

C. MARSHALL DANN
Commissioner of Patents